(12) United States Patent
Walker

(10) Patent No.: US 7,146,787 B2
(45) Date of Patent: Dec. 12, 2006

(54) WALK BEHIND MOWER

(75) Inventor: Dean M. Walker, Fort Collins, CO (US)

(73) Assignee: Walker Manufacturing Company, Fort Collins, CO (US)

( * ) Notice: Subject to any disclaimer, the term of this patent is extended or adjusted under 35 U.S.C. 154(b) by 127 days.

(21) Appl. No.: 10/602,417

(22) Filed: Jun. 23, 2003

(65) Prior Publication Data

US 2005/0011683 A1    Jan. 20, 2005

Related U.S. Application Data

(60) Provisional application No. 60/391,057, filed on Jun. 21, 2002.

(51) Int. Cl.
*A01D 34/64* (2006.01)
(52) U.S. Cl. ......................................... 56/15.8; 56/15.5
(58) Field of Classification Search ................. 56/16.5, 56/15.7, 15.8, 15.5
See application file for complete search history.

(56) References Cited

U.S. PATENT DOCUMENTS

| | | | | |
|---|---|---|---|---|
| 2,313,590 A * | 3/1943 | Sherer, Jr. et al. | ............ | 56/15.7 |
| 2,809,488 A * | 10/1957 | Sewell et al. | ................ | 56/13.8 |
| 2,809,705 A * | 10/1957 | Seweil et al. | ............... | 180/19.3 |
| 2,818,699 A * | 1/1958 | Clemson | ..................... | 56/11.5 |
| 3,154,903 A * | 11/1964 | Smith | ......................... | 56/15.8 |
| 3,183,653 A * | 5/1965 | Cromwell | .................... | 56/12.7 |
| 3,196,971 A * | 7/1965 | Schantz | ...................... | 180/19.2 |
| 3,375,645 A * | 4/1968 | Miller | ......................... | 56/16.2 |
| 3,921,372 A * | 11/1975 | Arnblock | ..................... | 56/12.8 |
| 4,487,006 A * | 12/1984 | Scag | ........................... | 56/14.7 |
| 4,876,846 A * | 10/1989 | Torras | ......................... | 56/11.9 |
| 4,920,733 A | 5/1990 | Berrios | | |
| 5,127,215 A * | 7/1992 | Wenzel | ........................ | 56/11.1 |
| 5,146,735 A * | 9/1992 | McDonner | ................... | 56/11.3 |
| 5,515,669 A * | 5/1996 | Schick et al. | ................ | 56/15.7 |
| 6,341,479 B1 * | 1/2002 | Scag et al. | .................... | 56/11.3 |
| 6,625,965 B1 * | 9/2003 | Wright et al. | ................ | 56/14.7 |

OTHER PUBLICATIONS

Kota et al., Design of Compliant Mechanisms: Applications to MEMS, found at www.engin.umich.edu/labs/csdl/papers/dsignofcm.pdf on Apr. 24, 2006.*
What are Compliant Systems? found at http://www.fixsys.com/comp-sys.shtml on Apr. 24, 2006.*

* cited by examiner

*Primary Examiner*—Meredith C. Petravick
(74) *Attorney, Agent, or Firm*—Cochran Freund & Young LLC; William W. Cochran

(57) ABSTRACT

Disclosed is a self propelled walk behind mower comprised of a tractor unit and a mowing deck. The tractor unit is hydrostatically driven with a unique control system whereby the forward speed of the tractor is set by operating an electric rocker switch with an operator's thumb. Hand levers are used to turn the tractor to the left and the right. The tractor unit comprises two drive wheels and a third wheel that is pivotally attached, letting the tractor unit stand upright when no implements are attached. Implements attach to the front of the tractor through a movable attachment so that the tractor and implement can closely follow the contour of the ground while keeping the operator controls in a convenient position.

4 Claims, 7 Drawing Sheets

WALK BEHIND MOWER

CROSS REFERENCE TO RELATED APPLICATIONS

This application claims benefit of and priority to U.S. Provisional Patent Application Ser. No. 60/391,057 entitled "Walk Behind Mower" by Dean M. Walker, filed Jun. 21, 2002, the entire contents of which are specifically incorporated herein by reference for all it discloses and teaches.

BACKGROUND OF THE INVENTION a. Field of the Invention

The present invention pertains generally to walk-behind mowers and specifically to walk-behind mowers that have electric speed control.

b. Description of the Background

Walk-behind mowers including a tractor unit and a mowing deck attached to the front of the tractor have been commercially available for a long time. Typically, the tractor has only two wheels and the mowing deck is rigidly connected to the forward end of the tractor. A serious disadvantage with such types of mowers is that the quality of cutting is not as good as desired, since the mower can 'scalp' the grass in some areas and leave the grass too long in other areas because the mowing deck is not able to closely follow the contour of the ground.

The operator controls for self-propelled walk behind mowers tend to be difficult to use while meeting the requirements of safety and operability. In some cases, the operator must continually grip two hand levers in order for the mower to move forward at a constant speed. Such a system is prone to operator fatigue.

It would therefore be advantageous to provide a mower that more accurately follows the contour of a lawn during mowing and further provides a set of operator controls that are not prone to operator fatigue.

SUMMARY OF THE INVENTION

The present invention overcomes the disadvantages and limitations of the prior art by providing a mower that has a deck removably attached to a walk behind, self-propelled tractor. The tractor has a set of operator controls that includes a rocker switch that is used to set the forward speed of the tractor and two hand levers that are used to brake each wheel individually for steering. The tractor is propelled using individual hydrostatic drives on each of two main drive wheels and has a third wheel pivotally mounted rearwardly that provides stability to the tractor when no implements are attached. The tractor has an articulated mower deck mounted to the front. The arrangement is better able to closely follow the contour of the ground during mowing of uneven surfaces and places the operator controls in a more comfortable and controllable position.

The present invention may therefore comprise a self propelled walk behind mower comprising: a tractor unit having left and right drive wheels and a tail wheel pivotably mounted rearwardly of the drive wheels for stability, the tractor having an internal combustion engine mounted between the drive wheels and the tail wheel, the drive wheels being independently powered by left and right hand hydrostatic drive units, the tractor unit further having a forward end; and a mower deck having two wheels pivotally mounted to the front of the mower deck, the mower deck mounted to the forward end of the tractor unit wherein the mower deck is able to pivot up and down and tilt side to side relative to the tractor unit such that the mower deck may follow the contour of the ground.

The present invention may further comprise a control system for a self propelled walk behind mower comprising: a speed lever disposed to be operated by the operator, the speed lever being connected to an actuator, a pair of adjustable stops moved in parallel by the actuator; a left lever being operably connected to a left stop and further connected to a left hydrostatic drive unit, the left lever being disposed to be operated by an operator's left hand, the left hydrostatic drive having a forward speed being limited by the obstruction of the left stop against the adjustable stop, the left lever adapted to bias the left stop against the adjustable stop and further being adapted to slow the left hydrostatic drive by the actuation of the left lever by the operator; and a right lever being operably connected to a right stop and further connected to a right hydrostatic drive unit, the right lever being disposed to be operated by an operator's right hand, the right hydrostatic drive having a forward speed being limited by the obstruction of the right stop against the adjustable stop, the right lever adapted to bias the right stop against the adjustable stop and further being adapted to slow the left hydrostatic drive by the actuation of the left lever by the operator.

The present invention may further comprise a method of controlling a self propelled walk behind mower comprising: activating a speed lever to move an actuator, the actuator being connected to adjustable stops, the adjustable stops disposed to simultaneously move a left stop and a right stop such that a left hydrostatic drive and a right hydrostatic drive connected to a left drive wheel and a right drive wheel are simultaneously activated to move the mower in a forward direction; activating a left lever that is operably connected to the left hydrostatic drive and further limited in travel by the adjustable stops, the activating of the left lever causing the left hydrostatic drive to slow down, causing the mower to turn to the left; and activating a right lever that is operably connected to the right hydrostatic drive and further limited in travel by the adjustable stops, the activating of the right lever causing the right hydrostatic drive to slow down, causing the mower to turn to the right.

The advantages of the present invention are that the mower is better able to follow the contour of the ground due to the articulated connection of the mower deck to the three wheeled tractor. Further, the positioning of the operator controls while following various ground contours is more comfortable and thus safer and less fatiguing. The control system for the mower allows for infinitely adjustable forward speed without requiring the operator to continually hold any handles other than an operator presence switch, further decreasing the fatigue of the operator.

DETAILED DESCRIPTION OF THE INVENTION

Figure 1:
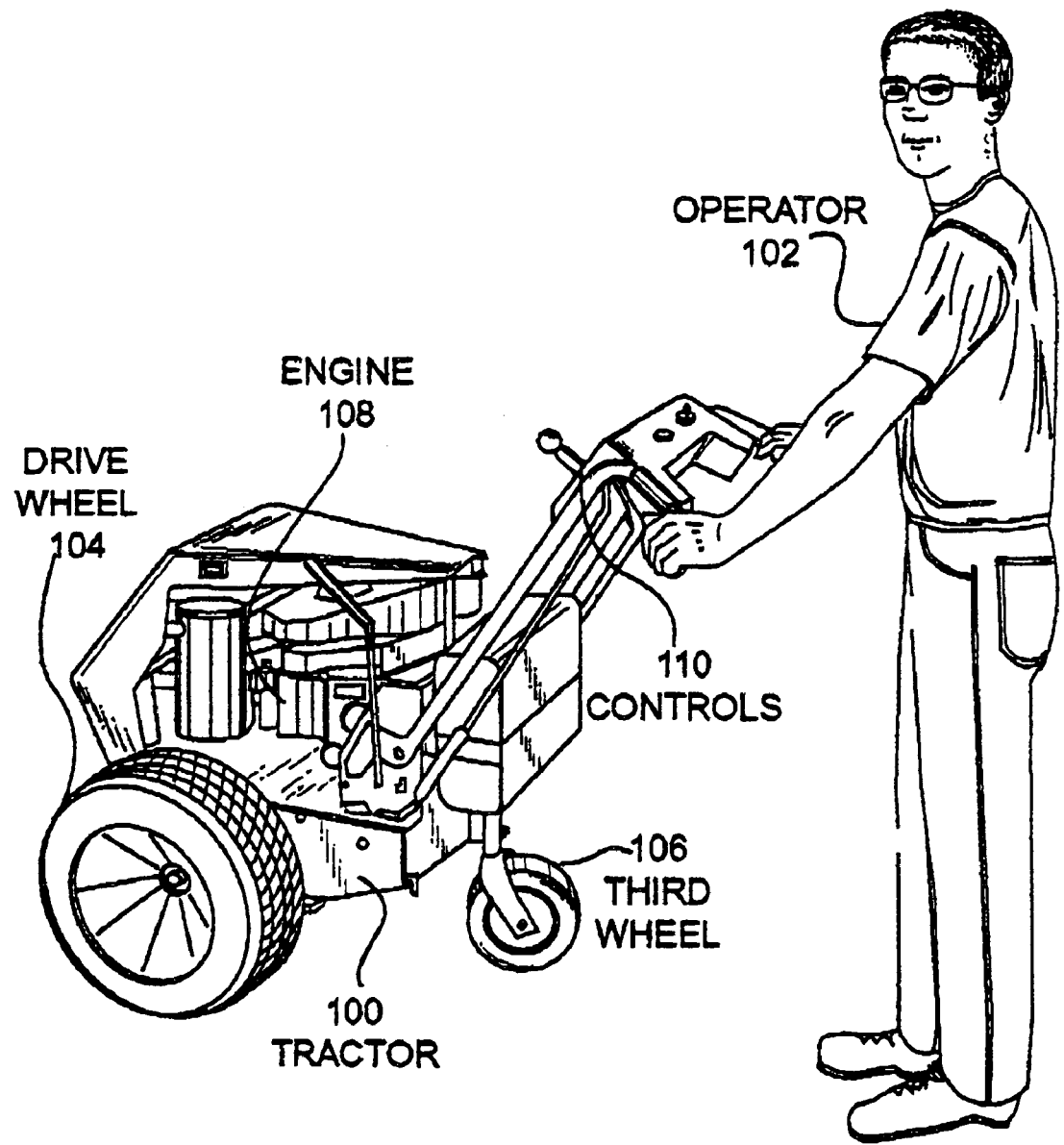
FIG. 1 is an illustration of an embodiment of the present invention showing a tractor and an operator.

FIG. 1 illustrates an embodiment of the present invention showing a tractor 100 and an operator 102. The tractor 100 has a drive wheel 104 and a third wheel 106 that pivots but is not driven or steered. The engine 108 powers the tractor. The operator controls 110 are also shown in the present figure.

Figure 2:
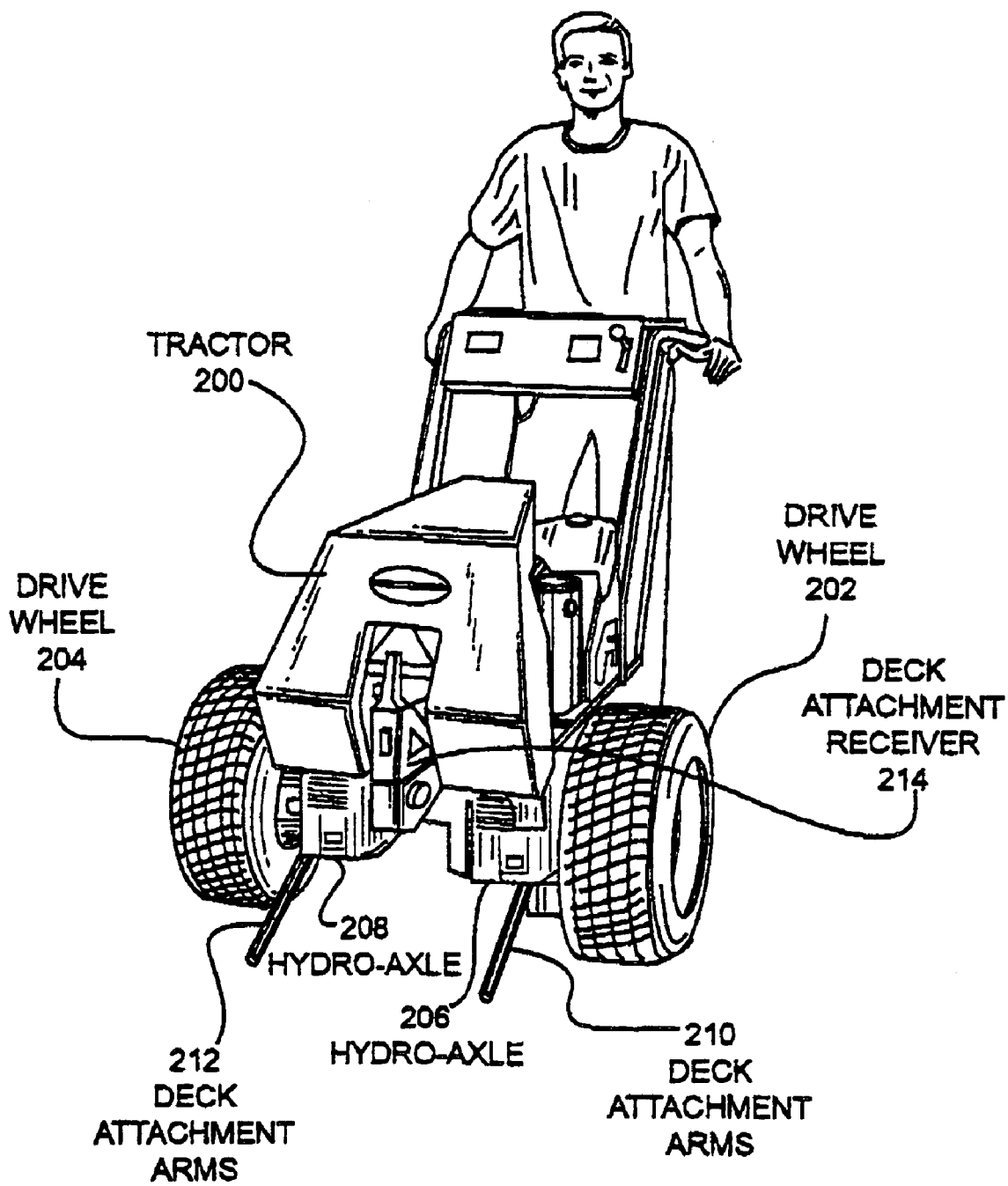
FIG. 2 is an illustration of a second view of an embodiment of the present invention showing a tractor and an operator.

FIG. 2 illustrates a second view of an embodiment of the present invention showing a tractor 200, a first drive wheel 202, and a second drive wheel 204. The drive wheel 202 is powered by a hydro-axle 206 and drive wheel 204 is powered by hydro-axle 208.

The hydro-axles 206 and 208 are powered by an engine and are controlled by an operator to direct the movement of the tractor 200. The hydro-axles 206 and 208 may be capable of infinitely adjustable speed control based on the input from the operator. Steering is achieved through differential speeds applied to the drive wheels 202 and 204. The hydro-axles 206 and 208 may further be capable of reversing direction. In the case where one hydro-axle is moving in reverse and the other hydro-axle is moving forward at the same speed, the tractor 200 may turn about an axis defined at the midpoint of the axis of the two wheels 202 and 204.

The deck attachment arms 210 and 212 along with the deck attachment receiver 214 may be used to attach a mowing deck or other implement on the front of the tractor 200. The deck attachment arms 210 and 212 are pivotally attached to the tractor 200. The deck attachment receiver 214 may receive a (i.e. compliant connector) whereby a mowing deck may flexibly move with respect to the tractor 200. The compliant mechanism allows the deck to tip up and down and further tilt side to side to follow the contour of the ground.

Figure 3:
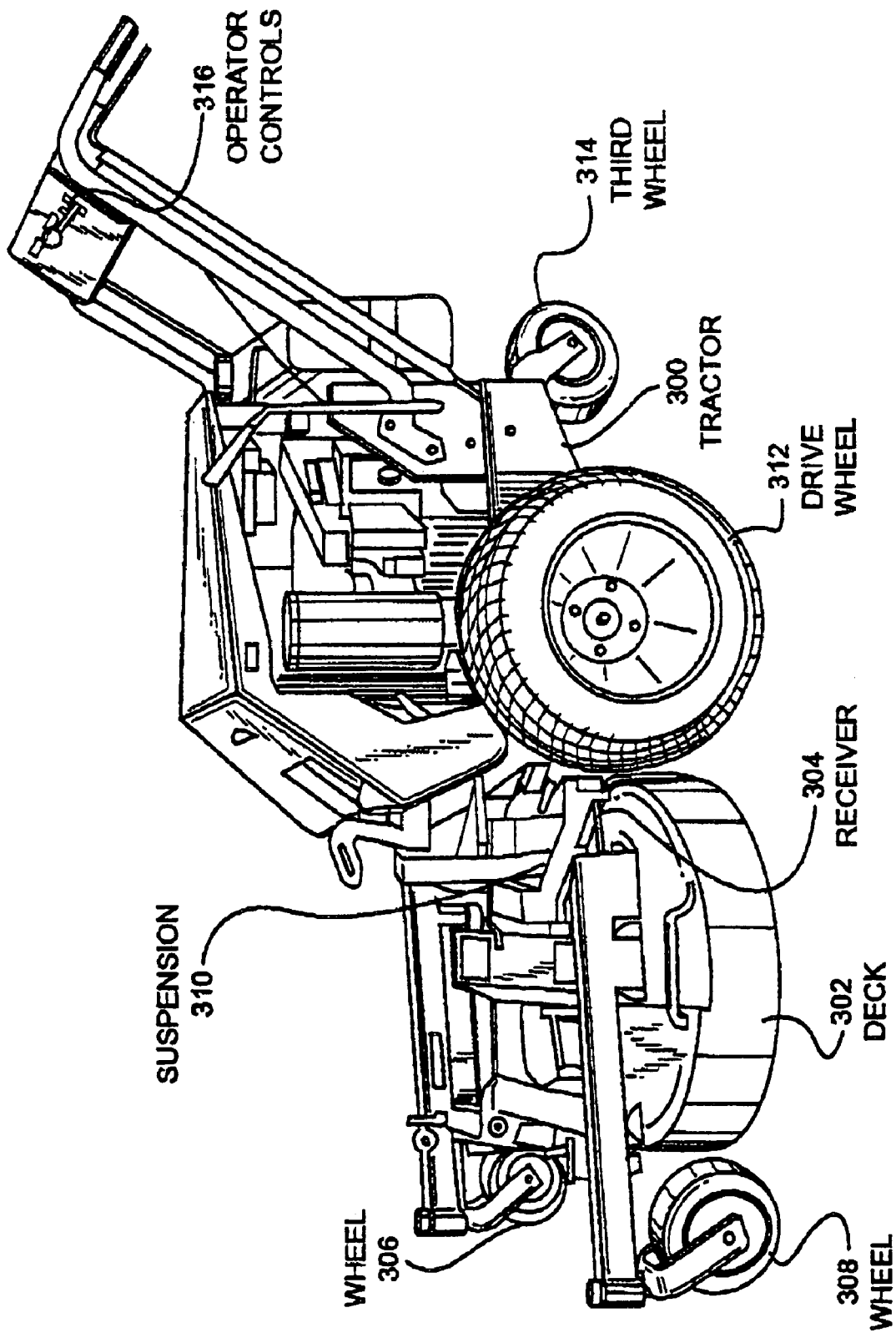
FIG. 3 is an illustration of an embodiment of the present invention comprising a tractor and a mowing deck.

FIG. 3 illustrates an embodiment of the present invention comprising a tractor 300 and a mowing deck 302. The mowing deck 302 is attached to the tractor 300 by sliding the deck attachment arms shown in FIG. 2 into receivers such as receiver 304. The deck 302 is supported at the tractor end by the deck attachment arms and at the opposite end by wheels 306 and 308. The suspension 310 couples the mower deck 302 to the tractor 300.

The deck 302 is able to move up and down with respect to the tractor 300 as well as rotate side to side to some extent. In the present embodiment, the mower deck may articulate plus or minus about 5 degrees with respect to the longitudinal vertical plane. The ability of the deck to follow the contour of the ground greatly enhances the mower's ability to leave a consistent and aesthetically pleasing lawn over rough contours.

The three wheeled design of the tractor 300 is such that the tractor is stable when no implements are attached. With the prior art two wheeled tractors, the tractor would tip over when not balanced by a mowing deck or other implement on the front. By having a third wheel, the drive wheels may be positioned as far forward as possible to give the implement, such as a mower deck, increased ability to follow the contours of the ground.

The third wheel further allows various implements of different weights and balances to be attached to the tractor and still operate smoothly. If the third wheel were not present and a heavy implement were attached to the front, the balance and feel of the machine would be drastically different than if the machine had a light weight implement, or none at all. Further, since the prior art machines are balanced differently for different weight implements, there would be increased operator fatigue with the prior art machines.

The deck 302 is able to articulate with respect to the tractor 300 along the horizontal plane. Since the tractor 300 is fully supported by two drive wheels 312 and the third wheel 314, the operator controls 316 will stay in a more comfortable position when mowing over a crest of a hill or when traversing a low spot.

Figure 4:
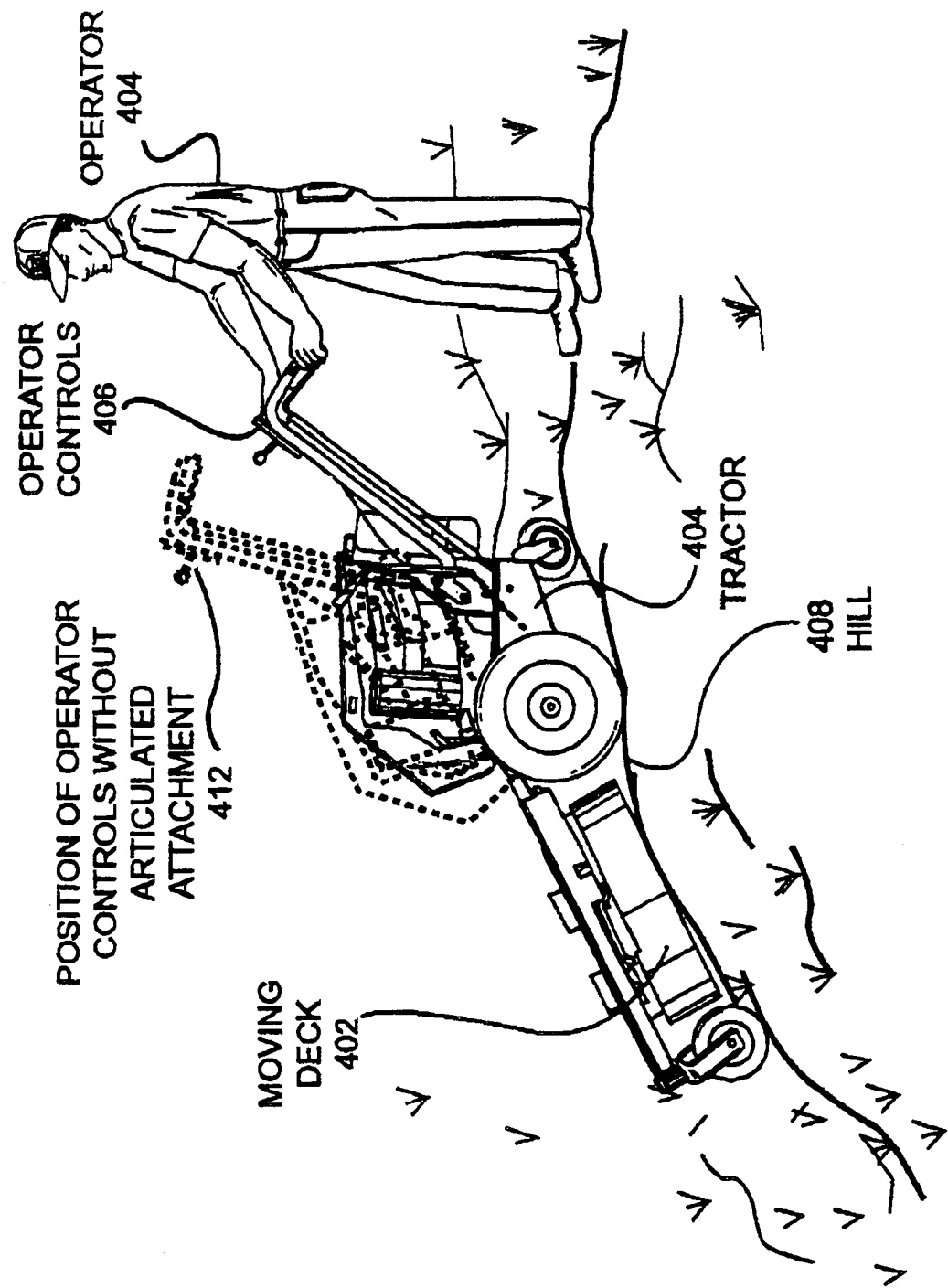
FIG. 4 is an illustration of the effect of the articulated arrangement of a tractor and a mowing deck.

FIG. 4 illustrates the effect of the articulated arrangement of a tractor 400 and a mowing deck 402. The operator 404 is in a comfortable position with respect to the operator controls 406 as the tractor 400 crests the hill 408. If the articulated arrangement were not present, the position of the tractor 400 may be illustrated by the phantom position 410. In the phantom position 410, the operator controls 412 would be significantly higher and more difficult to reach for the operator 404 than in the present embodiment 400. When the mower traverses a valley, the articulated arrangement of the tractor 400 and the mowing deck 402 keeps the operator controls 406 in a much more convenient position for the operator 404.

Figure 5:
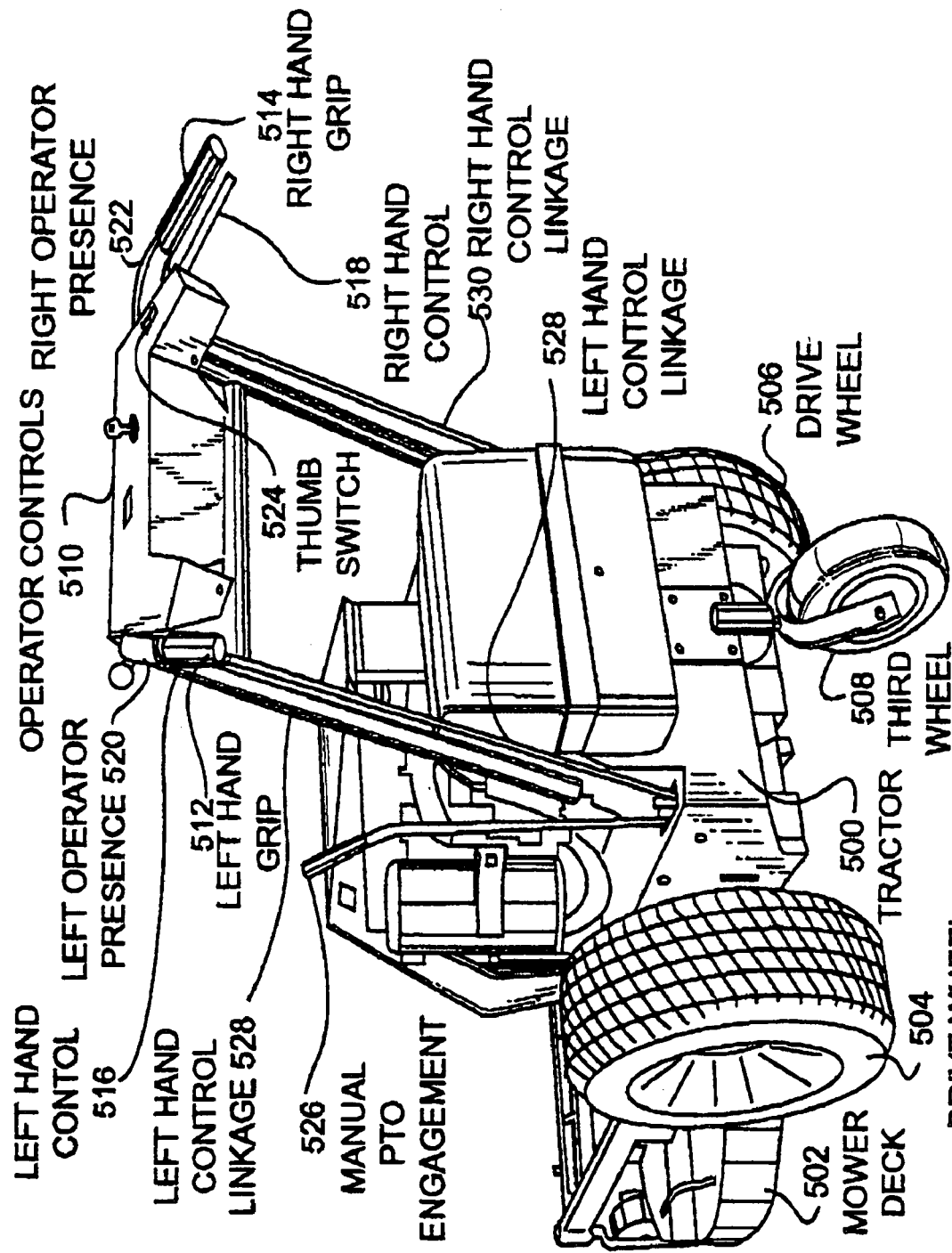
FIG. 5 is an illustration of a rear view of an embodiment of the present invention.

FIG. 5 illustrates a rear view of an embodiment of the present invention. The tractor 500 is shown from the rear with a mower deck 502, a left drive wheel 504, a right drive wheel 506, and a third wheel 508. The operator controls 510 comprise left and right hand grips 512 and 514, respectively, left and right hand controls 516 and 518, left and right operator presence levers 520 and 522, and a thumb switch 524.

The thumb switch 524 sets the forward speed control of the tractor 500. The thumb switch 524 is a three-position rocker switch movable by the operator's right thumb. As the operator presses the switch 524 in the forward position, the tractor 500 moves forward faster. As the operator releases the switch 524 to the center position, the forward speed is maintained. When the operator wishes to slow down, the rear position of the switch 524 may be pressed to slow down the tractor 500.

The hand controls 516 and 518 allow the operator to steer the tractor 500 by slowing or reversing the wheel associated with the respective hand control. For example, during forward motion, the operator may squeeze the left hand control 516 to slow the left hand drive wheel 504 and cause the tractor 500 to turn to the left. The sharpness of the turn is dictated by the amount that the operator grips the respective hand control. The hydro-axle system may have the capability of reversing the drive wheels. In such a case, squeezing the hand control completely will cause the drive wheel to reverse direction, allowing the tractor 500 to execute a zero radius turn. Likewise, simultaneously squeezing both hand controls completely will cause the tractor 506 to move in reverse.

The PTO engagement lever 526 may be used to engage the power take off for an implement such as the mower deck 502. The lever 526 may engage a mechanical clutch mechanism that transmits power to the deck 502.

Left and right operator presence levers 520 and 522 may be connected in parallel such that only one switch is necessary for the tractor to sense the operator presence. One or both of the levers 520 and 522 may be necessary for the tractor 500 to operate. For example, if the tractor were moving forward and the operator removed both hands from the controls 510, the levers 520 and 522 would disengage and the tractor would shut down or otherwise halt motion. When the PTO lever 526 is engaged, releasing both of the operator presence levers 520 and 522 will kill the engine and halt operation.

The left and right hand controls 516 and 518 are connected to left and right hand control linkages 528 and 530, respectively. The linkages 528 and 530 are connected to the hydro-axles though a mechanism that sets the forward speed of the hydro-axles simultaneously.

Figure 6:
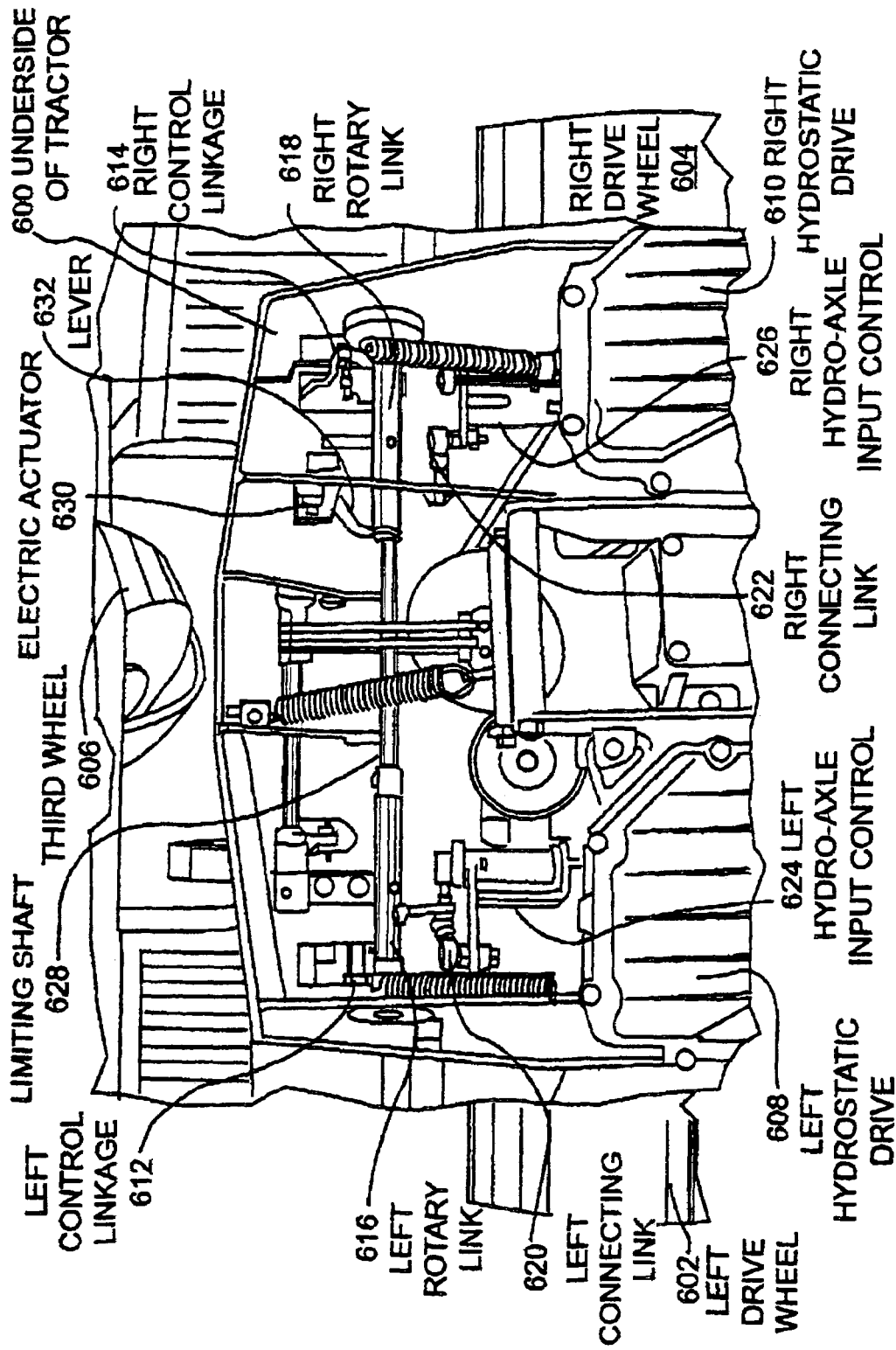
FIG. 6 is an illustration of the underside of an embodiment of a tractor showing the control linkages.

FIG. 6 illustrates the underside of an embodiment of a tractor 600. The left and right drive wheels 602 and 604 and the third wheel 606 are shown. Left and right hydro-axles 608 and 610 are connected to the wheels 602 and 604, respectively. The control linkages 612 and 614 are the control linkages 528 and 530 shown in FIG. 5. The control linkages 612 and 614 are connected to rotary links 616 and 618, which connect to connecting links 620 and 622, which connect to the hydro-axle input controls 624 and 626. This mechanism is the connection between the handle grips operated by the operator and the hydro-axles that control the forward and reverse speeds of the tractor.

The rotary links 616 and 618 are mounted on a limiting shaft 628. The limiting shaft 628 has stops, not shown in the present figure, that simultaneously limit the amount of travel the rotary links 616 and 618 can rotate. As the electric actuator 630 rotates the limiting shaft 628 through the lever 632, the rotary links 616 and 618 move to a position whereby the connecting links 620 and 622, the input controls 624 and 626, and thus the hydro-axles 608 and 610 are simultaneously engaged to move forward. The electric thumb switch 524 of FIG. 5 may be connected to the actuator 630 to change the forward speed of the tractor. At any time that the tractor is in a forward motion, the hand levers may be actuated to slow the speed of the tractor, bring the tractor to a halt, or reverse the motion of the tractor.

The term hydro-axle refers to a hydrostatic drive with an integrated, load carrying axle. For the present embodiment, the hydro-axle offers a compact and cost efficient design. Those skilled in the arts would appreciate that alternative designs comprising a hydrostatic drive with a separate axle system would be possible while maintaining within the scope and intent of the present invention.

Figure 7:
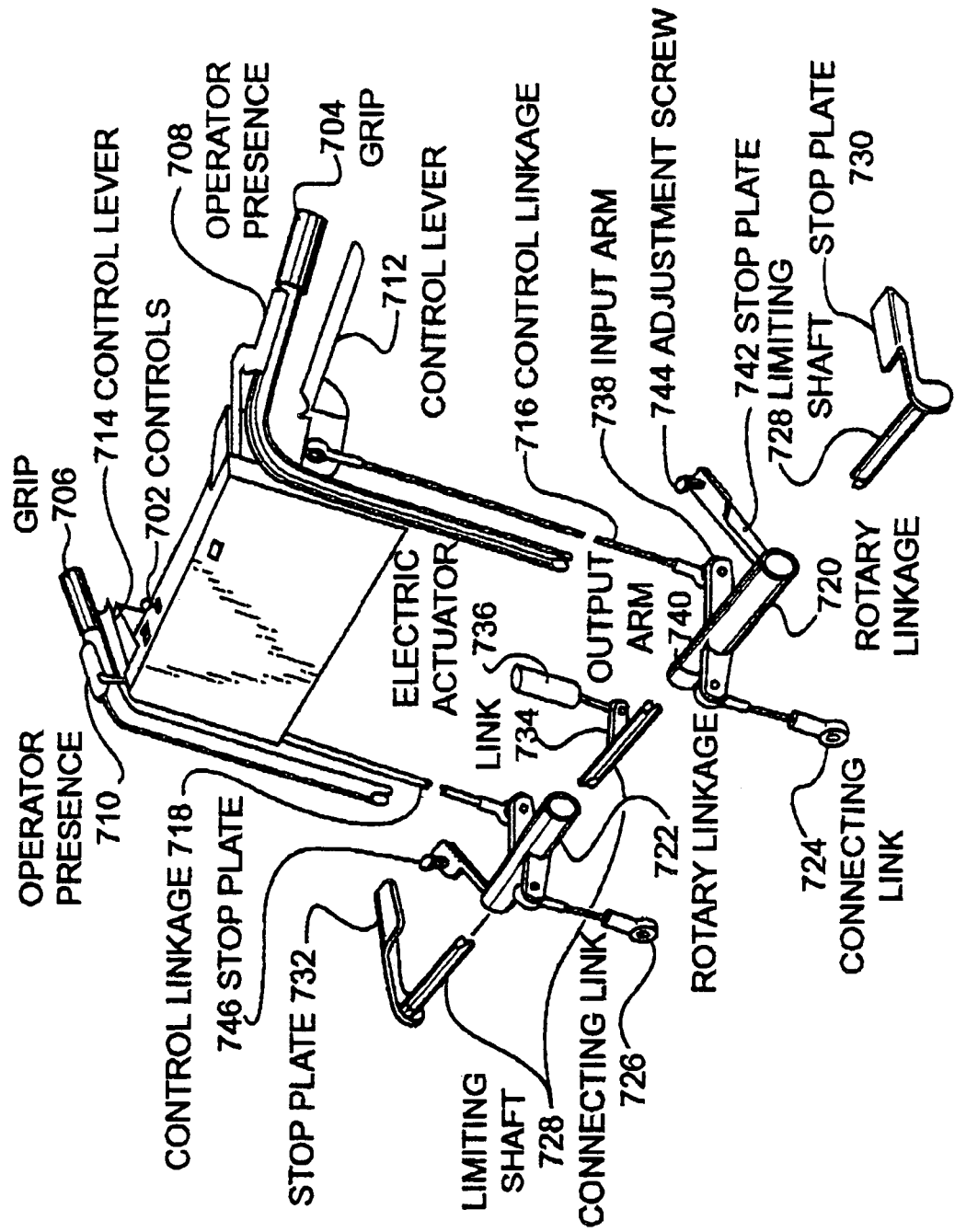
FIG. 7 is an illustration of an embodiment of the linkages used to control the tractor.

FIG. 7 illustrates an embodiment of the linkages used to control the tractor. The operator controls 702 comprise the left and right hand grips 704 and 706, operator presence levers 708 and 710, and control levers 712 and 714. Control levers 712 and 714 are connected to control linkages 716 and 718, respectively, that are connected to left and right rotary linkages 720 and 722. Each rotary link 720 and 722 are connected to connecting links 724 and 726 that connect to the independent hydro-axles not shown.

A limiting shaft 728 is shown in an exploded state in three pieces for clarity, but is rigidly connected in operation. The limiting shaft 728 has left and right stop plates 730 and 732 as well as a link 734 connected to an electric actuator 736.

The rotary link 720 is mounted on the limiting shaft 728 and comprises an input arm 738, and output arm 740, and a stop plate 742. The stop plate 742 has an adjustment screw 744. When assembled, the stop plate 742 and adjustment screw 744 is positioned to press against the limiting shaft stop plate 730.

When the electric actuator 736 moves, the stop plates 730 and 732 move simultaneously against the stop plates 742 and 746 to limit the amount of travel of the stop plates 742 and 746. As the travel of the respective stop plates are changed, the position of the rotary links 720 and 722 are changed, thusly changing the inputs to the independent hydro-axles and causing the tractor to change speed. Since the left and right hydro-axles are changed equally and simultaneously, the tractor will move in a straight line. At any time the tractor is moving in a straight line, an operator may change the speed of one or both wheels by actuating the levers 712 or 714.

The stop plates 730 and 732 change the limit on the maximum forward speed of the respective wheel, thus the actuation of levers 712 or 714 serve to slow the respective hydro-axle and thus the drive wheel. The benefit of the present embodiment is that the electric actuator 736 can be used to set the forward speed of the tractor and the operator does not need to grip the control levers 712 and 714 during normal forward speed. Since the operator is not required to continually grip the levers 712 and 714 during normal forward motion, the fatigue and discomfort of other walk behind mowers is alleviated. Another benefit of the electric actuator 736 is that the forward speed can be adjusted to the operator's preference. In some situations where tight turning may be critical, the speed may be adjusted to be somewhat slow. In situations where long stretches of straight motion are required, the operator may adjust the speed to be higher. As the operator approaches a turn, the speed can be simply lessened with a thumb switch such that the turn can be executed without difficulty.

Alternative arrangements for the forward speed control are possible. In the present embodiment, the operator uses an electric switch to actuate an electric actuator that moves two stops simultaneously. In other embodiments, the operator may move a mechanical lever to directly actuate the stops. Alternatively, hydraulic or other methods of actuation are possible by those skilled in the arts while maintaining within the scope of the present invention.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A self propelled walk behind mower comprising:
   a tractor unit having a forward end and a rearward end that define a lengthwise direction;
   an engine mounted on said tractor unit;
   hydrostatic drives mounted to said tractor unit that are driven by said engine;
   drive wheels coupled to said hydrostatic drives at said forward end of said tractor unit;
   a third wheel pivotally attached to said rearward end of said tractor unit that allows said tractor unit to stand upright with respect to a plane defined by said drive wheels and said third wheel when no implements are attached to said tractor unit and is fully supported by said drive wheels and said third wheel;
   handles attached to said tractor unit that extend rearwardly in said lengthwise direction, and that have controls that allow a user to control said tractor unit;
   deck attachment arms that extend in a forward direction from said forward end of said tractor unit;

a pivot attached to said forward end of said tractor unit and to said deck attachment arms that allow said deck attachment arms to pivot about an axis that is transverse to said lengthwise direction;

a mowing deck having a forward end and a rearward end, and at least two front wheels mounted on said forward end of said mowing deck;

deck attachment receivers disposed at said rearward end of said mowing deck that detachably engage said deck attachment arms so that said mowing deck pivots with respect to said tractor unit about said transverse axis, said deck attachment having a compliant connector that allows said mowing deck to flexibly move with respect to said tractor unit; and a suspension that detachably connects said mowing deck to said tractor unit and supports said rearward end of said mowing deck.

2. The self propelled walk behind mower of claim 1 wherein said pivot further comprises:

a pivot that operates in a range of approximately five degrees above and below said plane defined by said drive wheel and said third wheel.

3. The self propelled walk behind mower of claim 1 wherein said hydro drives further comprise:

a first hydro axle that is attached to a first wheel and that powers said first wheel, so that said first wheel rotates in a forward and reverse direction in response to an input from an operator; and a second hydro axle that is attached to a second wheel and that powers said second wheel so that said second wheel rotates in a forward and reverse direction in response to an input from an operator.

4. The self propelled walk behind mower of claim 3 wherein said drive wheels are substantially aligned with said pivot in said lengthwise direction at said forward end of said tractor.

* * * * *